United States Patent
Letounov et al.

(10) Patent No.: US 7,433,415 B2
(45) Date of Patent: Oct. 7, 2008

(54) SYSTEM AND METHOD FOR TRANSMISSION AND RECEPTION OF QAM SIGNALS AT LOW SIGNAL TO NOISE RATIO

(75) Inventors: Leonid Letounov, Gomel (BY); Aliaksandr Hryhoryeu, Gomel (BY); Victor Gunter, Tomsk (RU)

(73) Assignee: Modesat Communications OU, Tallinn (EE)

( * ) Notice: Subject to any disclaimer, the term of this patent is extended or adjusted under 35 U.S.C. 154(b) by 263 days.

(21) Appl. No.: 11/537,365

(22) Filed: Sep. 29, 2006

(65) Prior Publication Data

US 2007/0025466 A1    Feb. 1, 2007

Related U.S. Application Data

(63) Continuation of application No. PCT/BY2004/000008, filed on Mar. 30, 2004.

(51) Int. Cl.
    *H04L 23/02*    (2006.01)
(52) U.S. Cl. ...................................... 375/261
(58) Field of Classification Search ......... 375/261–265, 375/298, 323; 329/304–310; 332/103, 105
    See application file for complete search history.

(56) References Cited

U.S. PATENT DOCUMENTS 6,535,549 B1    3/2003    Scott et al.

(Continued)

FOREIGN PATENT DOCUMENTS

JP    11017759    1/1999

(Continued)

OTHER PUBLICATIONS

Webb W., Hanzo L. Modern Quadrature Amplitude Modulation. Principles and Applications Fixed and Wireless Communications. IEEE'1 Press-1994, p. 115-128, Pentech Press, London.

(Continued)

*Primary Examiner*—Don N Vo
(74) *Attorney, Agent, or Firm*—Houston Eliseeva LLP

(57) ABSTRACT

The system for transmission and reception of QAM signals for use in telecommunication networks for any data rates at SNR (signal to noise ratio) of below 0 dB comprises two devices. The first device may be used for transmission Units (1)-(4) transform input bit information sequence (17) with the clock frequency $f_t$ (18) into two parallel m-level sequences with the clock frequency $f_t/2k$ forming the first and second channels, where $k=\log_2(m)$. Unit (5) forming additional signals $$\text{Cos}\frac{\omega_t t}{4k}, A \cdot \text{Sin}\frac{\omega_t t}{4k},$$

where $\omega_t = 2\pi f_t$. Units (6), (7) multiply m-level sequences of the first and second channels with signal $$\text{Cos}\frac{\omega_t t}{4k}$$

for removal phase ambiguity at reception end, and units (8), (9) adding with signal $$A \cdot \text{Sin}\frac{\omega_t t}{4k} t,$$

defining level of the additional pilot-signal in output spectrum. Filters (10), (11) forming baseband QAM signal spectrum and units (12)-(16) shift of spectrum at intermediate or carrier frequency. The second device may be used for reception. Restoration of the carrier and clock frequencies at reception end performing with used two PLL (phase lock loop) systems using availability in signal spectrum additional pilot-signal. This allows one to set up synchronization for signal to noise ratio below 0 dB. In this case additional losses amounts 0.3-0.7 dB.

12 Claims, 6 Drawing Sheets

U.S. PATENT DOCUMENTS

2003/0058967 A1* 3/2003 Lin et al. .................... 375/327
2003/0141938 A1* 7/2003 Poklemba et al. ........... 332/103
2005/0018785 A1* 1/2005 Oshima ...................... 375/265

FOREIGN PATENT DOCUMENTS

| RU | 2210860 C1 | 8/2003 |
|---|---|---|
| SU | 866777 A | 9/1981 |
| WO | WO00/035195 A1 | 6/2000 |

OTHER PUBLICATIONS

Webb W., Hanzo L. Modern Quadrature Amplitude Modulation. Principles and Applications Fixed and Wireless Communications. IEEE Press-1994, p. 101-115, Pentech Press, London.

* cited by examiner

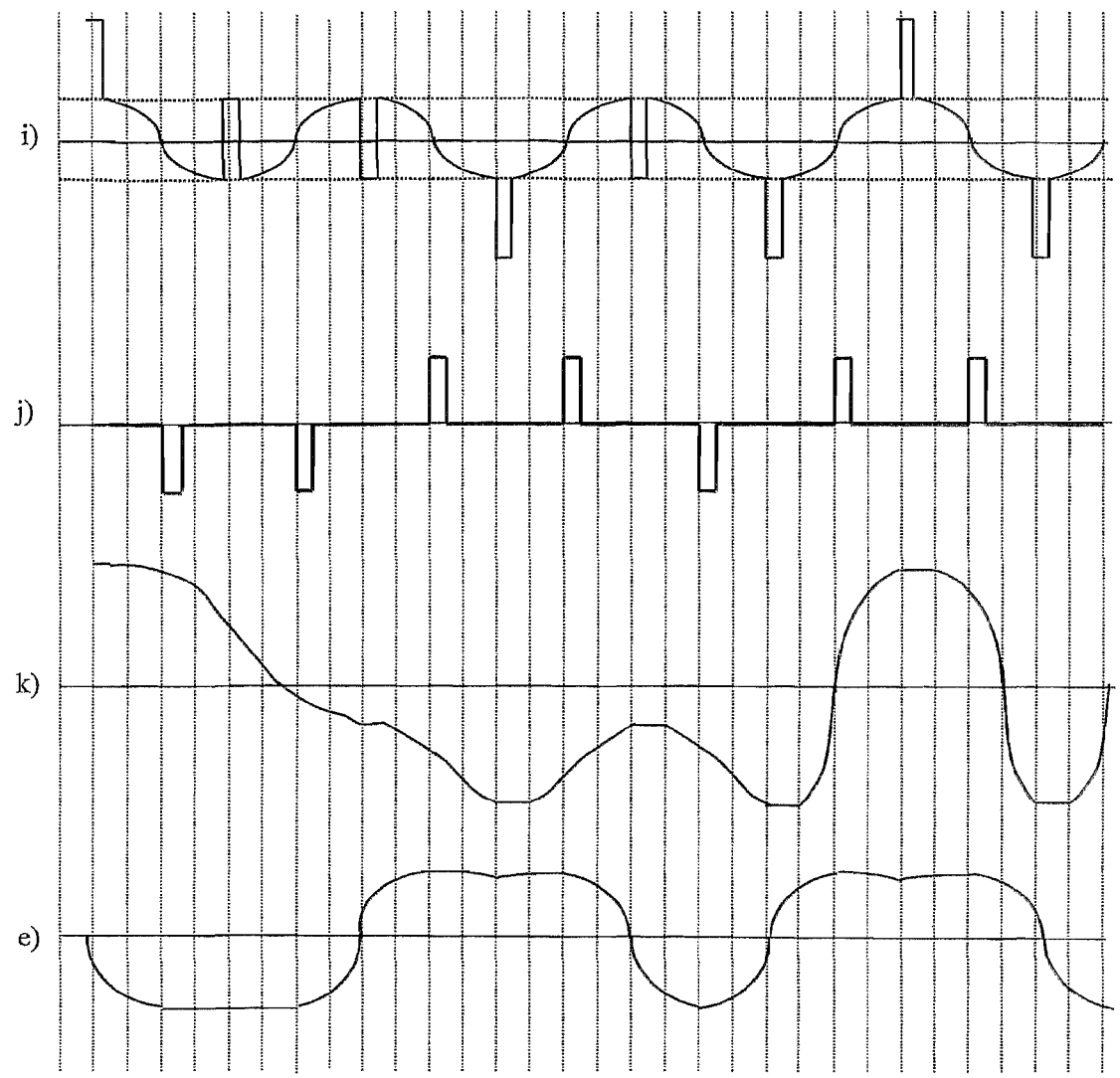
Fig. 5 (Continuation)

SYSTEM AND METHOD FOR TRANSMISSION AND RECEPTION OF QAM SIGNALS AT LOW SIGNAL TO NOISE RATIO

RELATED APPLICATIONS

This application is a Continuation of PCT application serial number PCT/BY2004/000008 filed on Mar. 30, 2004 which is incorporated herein by reference in its entirety.

BACKGROUND OF THE INVENTION

A number of methods of the transmission and reception of QAM (quadrature amplitude modulation) signals [1] applied in modern telecommunication systems are known. The power losses at demodulation of such QAM signals are defined by:
  method of restoration of the carrier frequency,
  method of restoration of clock frequency,
  selectivity by the adjacent channel,
  interference properties or the pulse characteristic of the communication channel At this the demodulation threshold, i.e. S/N ratio, at which the carrier frequency stops to be extracted is defined by the method of the formation of the signal and the method of the extraction of the carrier from this formed signal.

For modem types of modulation, such as QPSK, the threshold of S/N ratio, at which the carried is extracted amounts to 3-6 dB or in terms of $E_b/N_0$ 4.5-5 dB (for the rate of interference stable coding by Viterbi of ¾), and for modulation of the 8PSK type the threshold of demodulation is ever more— about 10 dB. At this in this point the reception is unstable, as the signal can get dropped and then captured again.

In order to reach Shannon threshold demodulation is to be performed already at S/N=4.8 dB for QPSK modulation at the non-coded signal, and at coding the threshold value of S/N to be even less (0 dB for the coding rate of ½, −2.3 dB for rates ⅓ and −3.8 dB for the rate of ¼), At present systems of interference stable coding, for instance Turbo-coding, which allow to reach Shannon threshold, are known. The hindrance factor is the absence of demodulators, which are capable to work at such low S/N ratios because of the absence of synchronization, which is connected with the methods of the formation of the signal and extraction of carrier from this signal. In the signal spectrums, which use such types of modulation as QPSK, 8PSK, 16QAM and so on there is no remainder of the carrier, therefore its coherent fluctuation is extracted from the received signal by a nonlinear transformation and the subsequent filtration. Such transformation is the method of the multiplication of frequency, which can be implemented by the raising of the input signal into M-degree (into the $4^{th}$ degree for QPSK, into the $8^{th}$ degree for 8PSK and so on). But not only the signal but also the noise is raised to the degree, which limits the threshold of the restoration of the carrier At this the phase ambiguity is formed, the removal of which requires the introduction into the signal of relative coding, which introduces the additional power losses.

SUMMARY OF THE INVENTION

The significant decrease of the demodulation threshold is reached at the application of the offered method of the data transmission and reception.

Items 1 and 2 of the claims characterize the offered method. The system made on the basis of the first method offered in Item 1 is disclosed in Item 3 of the claims of the invention, and the system made on the basis of the second method offered in Item 2 is disclosed in Item 4 of the claims of the invention.

BRIEF DESCRIPTION OF THE DRAWINGS

The peculiarities and advantages of the invention will presented in detail in the subsequent detailed description illustrated by the accompanying Figures., i.e.

DETAILED DESCRIPTION OF THE PREFERRED EMBODIMENTS

Figure 1:
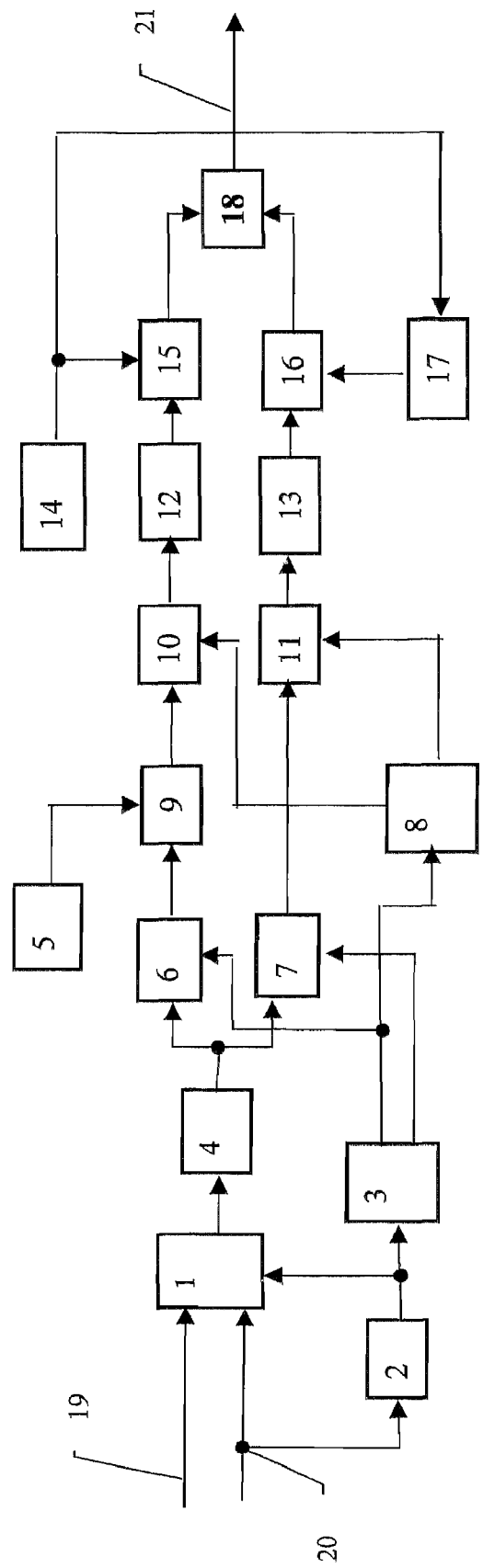
FIG. 1 a schematic presentation of the formation of the transmission signal by the first method, FIG. 2 a schematic presentation of the processing of the reception signal by the first method, FIG. 3 a schematic presentation of the formation of the transmission signal by the second method, FIG. 4 a schematic presentation of the processing of the reception signal by the second method, FIG. 5 oscillograms of the signals in several characteristic points of the schematic presentations at the formation of the signals by the first method.
Figure 2:
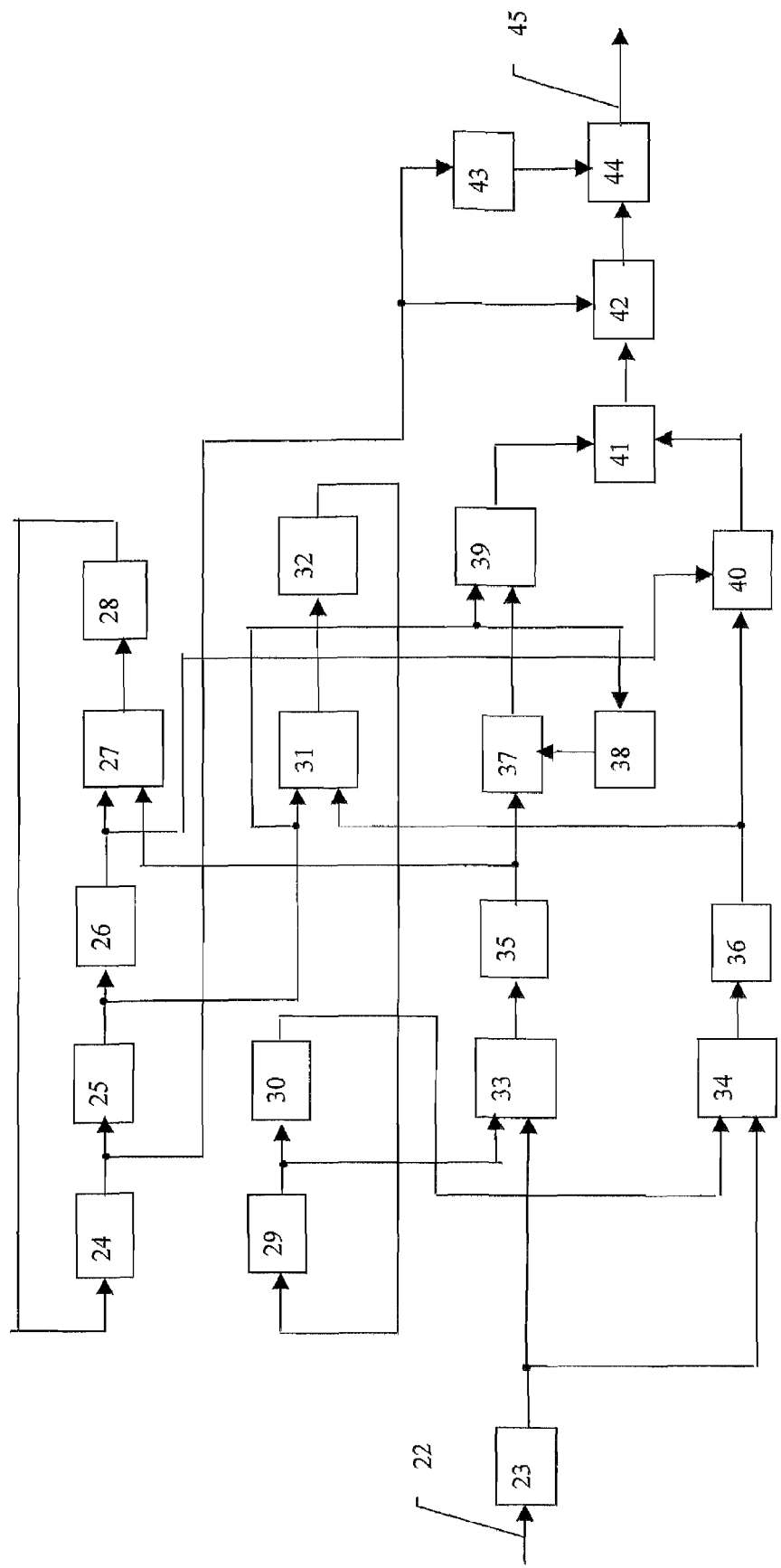

FIG. 1 and FIG. 2 show the transmission and reception parts respectively of the system of devices implemented by the first method of data transmission disclosed in the course of this description.

FIG. 1 shows the device for the formation from the input bit sequence 19 the signal for the transmission 21.

Figure 5:
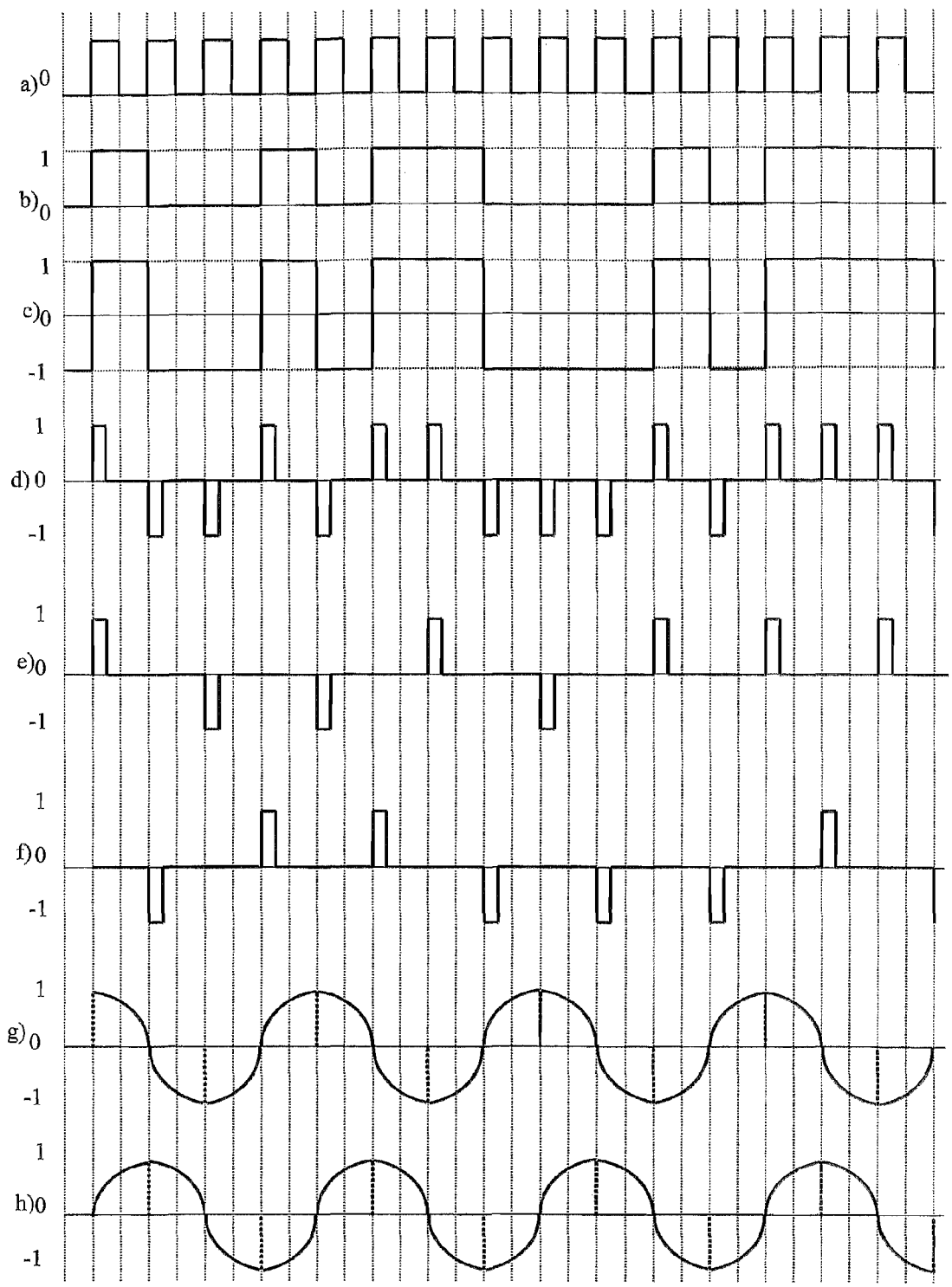

The information bit sequence 19 (FIG. 5b) with the clock frequency 20 (FIG. 5a), which is equal to $f_t$, comes to the input of unit 1, in which it is transformed into m-level sequence (FIG. 5c for m=2) with the clock frequency $f_t/k$, where $k=\log_2 m$ (for m=2 k=1), received with the help of unit 2. In unit 4 m-level sequence is transformed into m-level sequence of short pulses (FIG. 5d), which with the help of units 6 (FIG. 5e) and 7 (FIG. 5f) is separated respectively into the sequences of even and odd short pulses, forming the first and second channels respectively. For this the signals of the clock frequency $f_t/k$ from the output of unit 3, shifted with respect to each other for 180° are used. Then from signals of clock frequency $f_t/2k$ with the help of unit 8 signals $$\cos\frac{\omega_t t}{4k}$$

(FIG. 5g) and $$\sin\frac{\omega_t t}{4k}$$

(FIG. 5h) are formed, where $\omega_t = 2\pi f_t$.

The sequence of the first channel from the output of unit 6 is summed up in unit 9 with a constant component, formed by unit 5. Then the signal of the first channel is multiplied in unit 10 (FIG. 5i) with signal $$\cos\frac{\omega_t t}{4k},$$

and the signal from the second channel from output of unit 7 is multiplied in unit 11 (FIG. 5*j*) with signal $$\operatorname{Sin}\frac{\omega_t t}{4k}.$$

The thus received signals are subjected to filtration with pass-band edge $f_t/4k$ in units 12 (FIG. 5*k*) and 13 (FIG. 5*l*) respectively. In the signal of the first channel in the output of unit 12 besides the components formed by the information sequence, there is signal of $$\operatorname{Cos}\frac{\omega_t t}{4k}$$

type, whose level is defined by the level of the introduced constant component formed by unit 5. Then the signal from output of unit 12 is multiplied in unit 15 with signal $\operatorname{Cos} \omega_0 t$, where $$\frac{\omega_0}{2\pi} -$$

frequency of the carrier frequency formed in unit 14, and signal from output of unit 13 in unit 16 is multiplied with signal $\operatorname{Sin} \omega_0 t$, formed by unit 17 from signal $\operatorname{Cos} \omega_0 t$. Signals received as the result of multiplication are summed up in unit 18, thus forming the output signal 21 for transmission.

In this signal besides the components formed by the information sequence there are additional components in frequencies $$\frac{\omega_0}{2\pi} - \frac{f_t}{4k} \text{ and } \frac{\omega_0}{2\pi} + \frac{f_t}{4k},$$

whose level will define the additional power losses. If their power is 5-7% of the power of the main signal, the losses connected with these additional components will be equal to 0.2-0.3 dB.

FIG. 2 shows the device for processing the received signal 22 at the reception and restoration of information sequence 45.

In the reception end the information signal 22 is amplified, preliminarily filtered and transferred to the intermediary frequency $$\frac{\omega_{IF}}{2\pi}$$

with the help of unit 23.

The information signal of intermediary frequency from output of unit 23 is subjected to demodulation by its multiplication to the signals $\operatorname{Cos}(\omega_{IF} t)$ and $\operatorname{Sin}(\omega_{IF} t)$ in units 33 and 34 respectively, forming the first and second channels respectively. The signals of the first and second channels are filtered in units 35 and 36, extracting frequency components from 0 to $$\frac{f_t}{4k}.$$

Filtration in units 12, 35 and 13, 36 is connected between each other and is performed in such a way so that the go-through pulse characteristic of units 12 and 35, the same as units 13, 36 could provide the minimum intersimbol distortions, i.e. for instance could satisfy Nyquist criteria [2], as well as could take into account the distortions of the signal spectrum caused by the final duration of shot pulses of m-level information sequence.

Then the signal of the first channel is used in the first system PLL (phase lock loop), formed by units 24, 25, 26, 27, 28, for the extraction of the signal of clock frequency $f_t/k$ and signals $$\operatorname{Cos}\left(\frac{\omega_t}{4k}t\right) \text{ and } \operatorname{Sin}\left(\frac{\omega_t}{4k}t\right).$$

For this, in unit 27 signal $$\operatorname{Sin}\frac{\omega_t t}{4k},$$

received with the help of phase shift by $-\pi/2$ of signal $$\operatorname{Cos}\frac{\omega_t t}{4k}$$

of former 24, is multiplied with signal of the first channel from output of filter 35. The output signal of unit 27, processed by filter 28 is used for the adjustment of generator 24 of clock frequency $f_t/k$, from which with the help of former 25 signal $$\operatorname{Cos}\frac{\omega_t t}{4k}$$

is formed.

With the help of the second system PLL, formed by units 29, 30, 31, 32, 34 and 36 signals $\operatorname{Cos} \omega_{IF} t$ and $\operatorname{Sin} \omega_{IF} t$ are extracted. For this signal of the second channel in the output of unit 36 is multiplied in unit 31 with signal $$\operatorname{Cos}\frac{\omega_t t}{4k}$$

of former 25. Output signal of unit 31, processed by filter 32 is used for adjustment of generator 29.

For synchronization of both the first and second systems PLL the spectrum components $$\mathrm{Cos}\omega_{IF}t + \frac{\omega_t t}{4k} \text{ and } \mathrm{Cos}\omega_{IF}t - \frac{\omega_t t}{4k},$$

introduced in the transmission end are used.

From signal of the first channel in unit 37 signal $$\mathrm{Cos}\frac{\omega_t t}{4k}t$$

is subtracted in proportion assigned with the help of unit 38 and defined by value of the constant component added in the transmission end to the channel of the even m-level sequence of short pulses. Then the signal of the first channel is multiplied in unit 39 with signal $$\mathrm{Cos}\frac{\omega_t t}{4k}t,$$

and the signal of the second channel in unit 40 is multiplied with signal $$\mathrm{Sin}\frac{\omega_t}{4k}t.$$

The results of multiplication are summed up in unit 41. The received signal is subjected to analogue digital conversion in unit 42 with clock frequency $f_t/k$, receiving in the output m-level information sequence, which with the help of signal of clock frequency $f_t$, formed in unit 43, is converted with the help of converter 44 into the bit information sequence 45, which is the output signal.

The method described above can be applied for Offset QAM (O-QAM) signals. In case of use it is non-offset QAM signals a signal on transmission it is formed a little on another. The sequence of the first channel from an output of unit 6 (FIG. 1) is multiplied in unit 10 with a signal $$\mathrm{Cos}\frac{\omega_t}{4k}t,$$

then summarized with signal $$A \cdot \mathrm{Sin}\frac{\omega_t}{4k}t,$$

where A—value of a constant component, generated by unit 5, and further is filtered by a unit 12. As in this case the additional signal is untied with information sample on a receiving end its subtraction in a unit 37 (FIG. 2) is not required.

Figure 3:
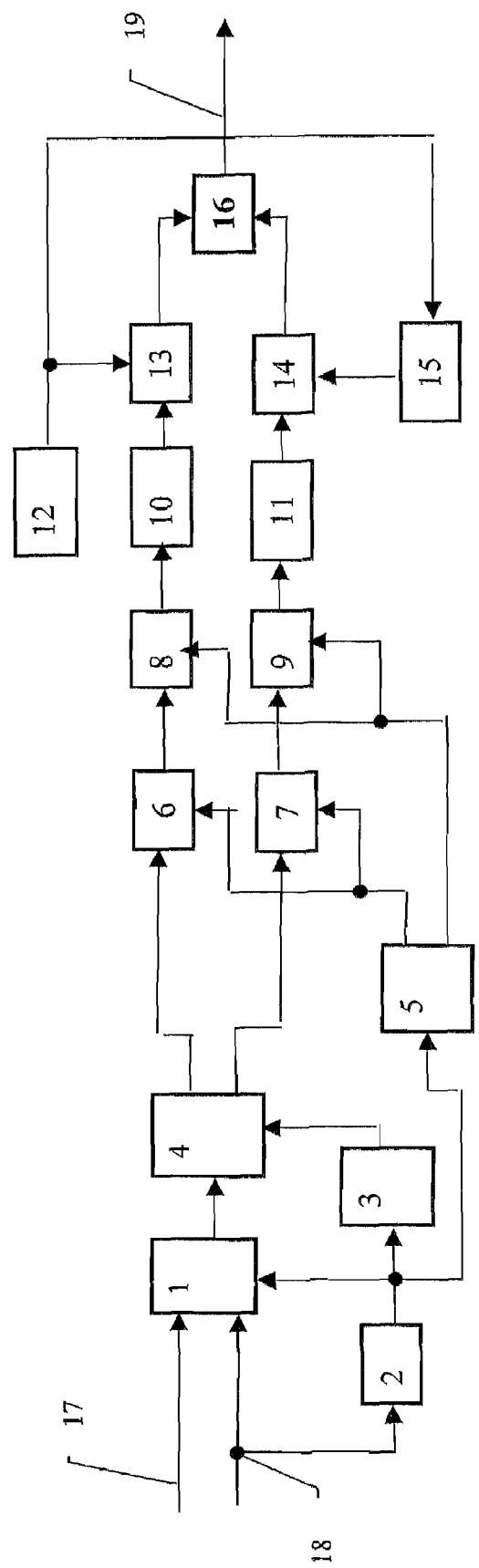
Figure 4:
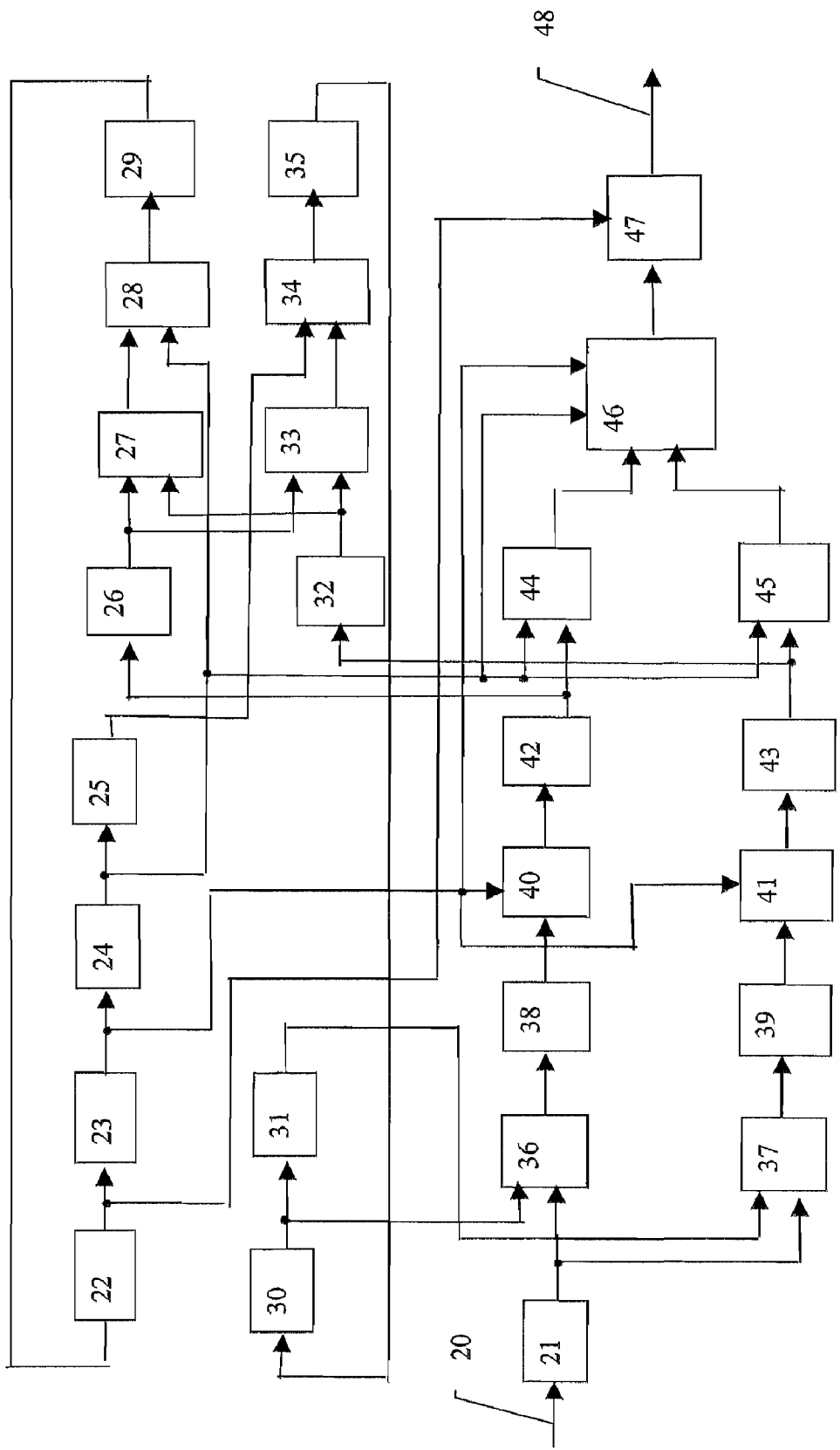

FIG. 3 and FIG. 4 show the transmission and reception parts respectively of the system of devices implemented by the second method of data transmission FIG. 3 shows the device for the formation from the input bit sequence 17 the signal for the transmission 19.

The information bit sequence 17 (FIG. 5*b*) with the clock frequency 18 (FIG. 5*a*), which is equal to $f_t$, comes to the input of unit 1, in which it is transformed into m-level sequence (FIG. 5*c* for m=2) with the clock frequency $f_t/k$, where k=log$_2$m (for m=2 k=1), received with the help of unit 2. In unit 4 m-level sequence is transformed into 2 parallel m-level sequences with the clock frequency $f_t/2k$ forming the first and second channels.

Then from clock frequency signals $$\frac{f_t}{k}$$

with the help of unit 5 signal $$\mathrm{Cos}\frac{\omega_t}{4k}t(\omega_t = 2\pi f_t)$$

is formed, which is the sequence of short pulses 1, 0, −1, 0, . . . , and signal $$A \cdot \mathrm{Sin}\frac{\omega_t}{4k}t,$$

which is the sequence of short pulses 0, A, 0, −A, . . . . Amplitude A defines the level of additional components in the output signal for transmission.

M-level sequences of the first and second channels are multiplied in units 6 and 7 respectively with signal $$\mathrm{Cos}\frac{\omega_t}{4k}t,$$

receiving sequences of m-level short pulses. The signals of both channels in units 8 and 9 are summed up with signal $$A \cdot \mathrm{Sin}\frac{\omega_t}{4k}t.$$

The thus received signals are subjected to filtration with the frequency of edge $$\frac{f_t}{4k}$$

in units 10 and 11 respectively. In the signals of both channels at the outputs of filters 10, 11 besides the components formed by the information sequence signal $$A \cdot \mathrm{Sin}\frac{\omega_t}{4k}t$$

is present whose level is defined by the level of the assigned value A.

Then signal from output of filter 10 is multiplied in unit 13 with signal Cos $\omega_0 t$, where $$\frac{\omega_0}{2\pi}$$

frequency of carrier fluctuation formed in unit 14. Signal from output of filter 11 in unit 14 is multiplied with signal Sin $\omega_0 t$ formed by unit 15 from signal Cos $\omega_0 t$. Signals received as the result of multiplication are summed up in unit 16 thus forming the output signal 19 for transmission.

This signal besides the components formed by information sequence has additional components at frequencies $$\frac{\omega_0}{2\pi} - \frac{f_t}{4k}$$

and $$\frac{\omega_0}{2\pi} + \frac{f_t}{4k},$$

whose level will define additional power losses.

FIG. 4 shows the device for the processing of the received signal 20 at the reception and restoration of information sequence 48.

At the reception end information signal 20 is amplified, preliminarily filtered and transferred to intermediary frequency $$\frac{\omega_{IF}}{2\pi}$$

with the help of unit 21.

The information signal of intermediary frequency from output of unit 21 is subjected to demodulation by its multiplication with signals Cos $\omega_{IF} t$ and Sin $\omega_{IF} t$ in units 36 and 37 respectively forming the first and second channels respectively. Signals of the first and second channels are preliminarily filtered with the help of low pass frequency filters 38, 39 with the frequency edge $$\frac{f_t}{2k}$$

and perform the analogue digital conversion in units 40, 41 with clock frequency $$\frac{f_t}{k}.$$

Then, the signals of both channels are filtered in the optimal way with the help of filters 42 and 43, extracting frequency components from 0 to $$\frac{f_t}{4k}$$

Filtration in units 10 (FIG. 3), 42 and 11 (FIG. 3), 43 is connected between themselves and is performed in such a way so that the go-through pulse characteristic of units 10 and 42, the same as of units 11 and 43 could provide the minimum of inter-symbol distortions, i.e. for instance Nyquist criteria [2], as well as took into account the distortions of the signal spectrum caused by the finite duration of short pulses of m-level information sequence.

For the use in PLL systems the signals of the first and second channels are filtered ill units 26 and 32 respectively. Filters 26 and 32 are high pass frequency filters or pass filters adjusted for frequency $$\frac{f_t}{4k}$$

and required for the extraction of signal $$A \cdot \operatorname{Sin} \frac{\omega_t}{4k} t$$

and decrease of the influence of the information spectrum.

For the extraction of clock frequency signals $$f_t, \frac{f_t}{k}$$

and signals $$\operatorname{Cos} \frac{\omega_t}{4k} t, \operatorname{Sin} \frac{\omega_t}{4k} t$$

the first PLL system formed by units 22-29, 32, 40-43 is used. For this the output signals of filters 26 and 32 are summed up in unit 27 and multiplied in unit 28 with signal $$\operatorname{Cos} \frac{\omega_t}{4k} t$$

of former 24. The output signal of unit 28, processed by loop filter 29 is used for adjustment of generator 22 of clock frequency $f_t$, from which with the help of divider 23 clock frequency $$\frac{f_t}{k}$$

is received from which in its turn with the help of former 24 signal $$\operatorname{Cos} \frac{\omega_t}{4k} t$$

is received.

For extraction of signals $\cos \omega_{IF} t$ and $\sin \omega_{IF} t$ the second PLL system formed by units 26, 30-43 is used. For this from output signal of filter 26 the output signal of filter 32 is subtracted in unit and multiplied in unit 34 with signal $$\sin \frac{\omega_t}{4k} t,$$

received with the help of phase shift for $-\pi/2$ of signal $$\cos \frac{\omega_t t}{4k}$$

of former 24. Output signal of unit 34 processed by loop filter 35 is used for adjustment of generator 30 forming signal $\cos \omega_{IF} t$ and shifted by phase for $-\pi/2$ with the help of phase rotator 31 of signal $\sin \omega_{IF} t$.

Then signals of the first and second channels from outputs of filters 42 and 43 are multiplied in units 44 and 45 respectively with signal $$\cos \frac{\omega_t t}{4k},$$

which is the sequence 1, 0, −1, 0 . . . with clock frequency $$\frac{f_t}{k},$$

for the removal of phase ambiguity at the caller extraction. The thus received two m-level sequences with the help of converter 46 are combined in one m-level sequence with clock frequency $$\frac{f_t}{k},$$

which in its turn using unit 47, converting into bit information sequence 48 with clock frequency $f_t$, which is the output signal.

Therefore, in the offered methods of data, transmission and reception the carrier frequency with frequency $$\frac{\omega_{IF}}{2\pi}$$

is extracted in the reception end by the linear method with the help of ordinary PLL, which uses the adjusted generators with frequencies $$f_{IF} \text{ and } \frac{f_t}{k},$$

which allows to reduce the demodulation threshold for QPSK signals as a minimum for 6 dB, and for 8PSK signals even more. Demodulator at this has the losses of not more than 0.5 dB, which is comparable with the losses of the existing demodulators and permit the work at signal to noise ratio of −3 dB and less. The transmission part is built in such a way so that in the reception end the use of non-linear transformations of the $4^{th}$, $8^{th}$ and $16^{th}$ orders is not needed to extract the carrier frequency, which is required in the existing demodulators. Demodulator in the offered methods becomes universal, suitable for demodulation of any QAM signals. Besides it misses the phase ambiguity at demodulation and that means there is no need to introduce the relative coding for its removal and that additionally reduces power losses.

All units applied in the offered methods of the transmission and reception of QAM signals are validated in practice. Therefore it can be quickly implemented in combination for instance with Turbo coding in the form of the modem, which can be easily placed in the already existing radio communication infrastructure and its technical characteristics allow the economy the power and frequency resources at the maintenance of the existing data transmission rates.

What is claimed is:

1. Method for transmission of QAM (quadrature amplitude modulation) signals to be applied in telecommunication networks for any data rate at the signal to noise ratio below 0 dB, the method comprising the following steps:

converting an initial information bit sequence with a clock frequency $f_t$ into an m level sequence with a clock frequency $f_t/k$, where k=log$_2$(m);

converting the m-level sequence into a sequence of m-level short pulses with an off duty factor greater than 2;

forming a first channel and a second channel by dividing of m-level short pulses with the clock frequency $f_t/2k$ into even and odd sequences, respectively;

summing up a signal of the first channel with a constant component;

multiplying the signal of the first channel with signal $$\cos\left(2\pi \frac{f_t}{4k} t\right),$$

and a signal of the second channel with signal $$\sin\left(2\pi \frac{f_t}{4k} t\right),$$

respectively;

filtering the signal of the first channel and the signal of the second channel and extracting frequency components from 0 to $$\frac{f_t}{4k};$$

multiplying the signal of the first channel with $\cos \omega_0 t$, and the signal of the second channel with signal $\sin \omega_0 t$, where $$\frac{\omega_0}{2\pi} -$$

is a carrier frequency, and obtaining result signals of the first and the second channels; and summing up the result signals and forming the signal for transmission.

2. Method for reception of QAM (quadrature amplitude modulation) signals to be applied in telecommunication networks for any data rate at the signal to noise ratio below 0 dB, the method comprising the following steps:

transferring an information signal to an intermediary frequency $$\frac{\omega_{IF}}{2\pi}$$

forming a signal of intermediate frequency;

demodulating the signal of intermediary frequency by its multiplication by signals Cos $\omega_{IF}$t and Sin $\omega_{IF}$t, forming the first and the second channels, respectively;

filtering a signal of the first channel and a signal of the second channel to extract frequency components from 0 to $$\frac{f_t}{4k};$$

using a first system PLL (phase lock loop) to extract a signal of clock frequency $$\frac{f_t}{k}$$

and signals $$\text{Cos}\frac{\omega_t t}{4k},$$
$$\text{Sin}\frac{\omega_t t}{4k}$$

from the signal of the first channel, and using a second system PLL to extract signals Cos $\omega_{IF}$t, Sin $\omega_{IF}$t from the signal of the second channel, from the signals $$\text{Cos}\left(\omega_{IF}t + \frac{\omega_t t}{4k}\right) \text{ and } \text{Cos}\left(\omega_{IF}t - \frac{\omega_t t}{4k}\right)$$

present in the information signal;

extracting from the signal of the first channel signal $$\text{Cos}\frac{\omega_t t}{4k}$$

in proportion defined by the value of a constant component added to a transmission end to the first channel;

multiplying the signal of the first channel by signal $$\text{Cos}\frac{\omega_t t}{4k},$$

and the signal of the second channel by signal $$\text{Sin}\frac{\omega_t t}{4k},$$

obtaining result signals of both channels;

summing up the result signals and converting the sum into a digital form with a clock frequency $$\frac{f_t}{k}$$

to obtain an m-level information sequence;

converting the m-level information sequence with the clock frequency $$\frac{f_t}{k}$$

into a bit information sequence with the clock frequency $f_t$, corresponding to an original output signal.

3. Method for transmission of QAM (quadrature amplitude modulation) signals to be applied in telecommunication networks for any data rate at the signal to noise ratio of below 0 dB, comprising the steps of:

converting an initial information bit sequence with a clock frequency $f_t$ into an m-level sequence with a clock frequency $f_t/k$, where k=log$_2$(m);

converting the m-level sequence with the clock frequency $$\frac{f_t}{k}$$

into two parallel sequences with a clock frequency $$\frac{f_t}{2k},$$

forming the first and the second channel, respectively;

multiplying a signal of the first channel and a signal of the second channel by signal $$\text{Cos}\left(2\pi\frac{f_t}{4k}t\right),$$

which is a sequence of short pulses 1,0,−1,0, . . . with the clock frequency $$\frac{f_t}{k};$$

summing up the signals of the first and second channels with signal $$A \cdot \operatorname{Sin}\left(2\pi \frac{f_t}{4k} t\right),$$

which is a sequence of short pulses 0,A,0,–A, . . . with the clock frequency $$\frac{f_t}{k};$$

filtering the signals of both channel to extract frequency components from 0 to $$\frac{f_t}{4k};$$

multiplying the signal of the first channel with Cos $\omega_0$t, and the signal of the second channel with signal Sin $\omega_0$t, where $$\frac{\omega_0}{2\pi}$$

is a frequency of carrier fluctuation; and
summing up resulting signals of both channels to form a signal for transmission.

4. A Method for reception of QAM (quadrature amplitude modulation) signals to be applied in telecommunication networks for any data rate at the signal to noise ratio of below 0 dB, comprising the steps of:
transferring an information signal to an intermediary frequency $$\frac{\omega_{IF}}{2\pi}$$

forming a signal of intermediate frequency;
extracting signals of clock frequencies $$f_t, \frac{f_t}{k}$$

and signals $$\operatorname{Cos}\frac{\omega_t t}{4k}, \operatorname{Sin}\frac{\omega_t t}{4k}$$

by means of a first PLL system, and signals Cos $\omega_{IF}$t, Sin $\omega_{IF}$t by means of a second PLL system using components in the information signal at frequencies $$f_{IF}t + \frac{f_t t}{4k}$$

-continued
and $$f_{IF}t - \frac{f_t t}{4k};$$

demodulating the signal of intermediary frequency by its multiplication by signals Cos $\omega_{IF}$t and Sin $\omega_{IF}$t, forming the first and the second channels respectively;
converting a signal of the first channel and a signal of the second channel into a digital form with clock frequency $$\frac{f_t}{k};$$

filtering the signal of the first channel and the signal of the second channel and extracting frequency components from 0 to $$\frac{f_t}{4k};$$

multiplying the signals of the first and the second channels by signal $$\operatorname{Cos}\left(2\pi \frac{f_t}{4k} t\right),$$

which is a sequence 1,0,–1,0, . . . with the clock frequency $$\frac{f_t}{k};$$

converting two m-level signals of the first and the second channels with the clock frequency $$\frac{f_t}{k}$$

into one m-level information sequence; and
converting the one m-level information sequence with clock frequency $$\frac{f_t}{k}$$

into a bit information sequence with clock frequency $f_t$, forming an output signal.

5. Method for transmission of QAM (quadrature amplitude modulation) signals to be applied in telecommunication networks for any data rate at a signal to noise ratio of below 0 dB, comprising the steps of:
converting an initial information bit sequence with a clock frequency $f_t$ into a multilevel sequence with a clock (symbol) frequency $f_s$, forming an inphase channel and a quadrature channel;

multiplying a signal of the inphase channel and a signal of the quadrature channel by signal $$\mathrm{Cos}\left(2\pi\frac{f_s}{2}t\right)$$

with a clock frequency $\geq 2*f_s$;
summing up the signals of the inphase and quadrature channels with signal $$A\cdot\mathrm{Sin}\left(2\pi\frac{f_s}{2}t\right)$$

with a clock frequency $\geq 2*f_s$ orthogonal to all information samples;
filtering the signals of both the inphase and the quadrature channels to extract frequency components from 0 to $$\frac{f_s}{2};$$

transferring the signals of both channels to a carrier frequency for transmission.

6. Method for reception of QAM (quadrature amplitude modulation) signals to be applied in telecommunication networks for any data rate at a signal to noise ratio of below 0 dB, comprising the steps of:
extracting a clock frequency $f_s$ by means of a first PLL system, and a carrier frequency by means of a second PLL system working together and implementing inphase processing of signal $$A\cdot\mathrm{Sin}\left(2\pi\frac{f_s}{2}t\right);$$

demodulating a receiving signal of the carrier frequency, forming an inphase channel and a quadrature channel;
filtering a signal of the inphase channel and a signal of the quadrature channel and extracting frequency components from 0 to $$\frac{f_s}{2};$$

multiplying the signal of the inphase and the signal of the quadrature channels by signal $$\mathrm{Cos}\left(2\pi\frac{f_s}{2}t\right)$$

with a clock frequency $\geq f_s$ to remove a phase ambiguity;
converting two signals of the inphase and the quadrature channels with the clock frequency $f_s$ into a bit information sequence with a clock frequency $f_t$, forming an output signal.

7. Method for transmission of QAM (quadrature amplitude modulation) signals to be applied in telecommunication networks for any data rate at a signal to noise ratio of below 0 dB, comprising the steps of:
converting an initial information bit sequence with a clock frequency $f_t$ into a multilevel sequence with a clock (symbol) frequency $f_s$, forming an inphase channel and a quadrature channel;
summing up a signal of the inphase channel with a constant component A;
multiplying the signal of the inphase channel with signal $$\mathrm{Cos}\left(2\pi\frac{f_s}{2}t\right),$$

and multiplying a signal of the quadrature channel with signal $$\mathrm{Sin}\left(2\pi\frac{f_s}{2}t\right),$$

respectively, with clock frequency $\geq 2f_s$;
filtering the signals of both inphase and quadrature channels to extract frequency components from 0 to $$\frac{f_s}{2};$$

transferring the signals of both channel to a carrier frequency for forming QAM signal and transmission.

8. Method for reception of QAM (quadrature amplitude modulation) signals to be applied in telecommunication networks for any data rate at a signal to noise ratio of below 0 dB, comprising the steps of:
extracting clock frequency $f_s$ by means of a first PLL system, and a carrier frequency by means of a second PLL system working together and implementing inphase processing of signal $$A\cdot\mathrm{Cos}\left(2\pi\frac{f_s}{2}t\right);$$

demodulating a received signal of a carrier frequency, forming an inphase channel and a quadrature channel;
filtering a signal of the inphase channel and a signal of the quadrature channel and extracting frequency components from 0 to $$\frac{f_s}{2};$$

subtracting from the signal of the inphase channel signal $$A\cdot\mathrm{Cos}\left(2\pi\frac{f_s}{2}t\right)$$

which was added to the inphase channel with the clock frequency $\geq f_s$ at a transmission end;
multiplying the signal of the inphase channel by signal $$\mathrm{Cos}\left(2\pi\frac{f_s}{2}\right)t,$$

and multiplying the signal of the quadrature channel by signal $$\mathrm{Sin}\left(2\pi\frac{f_s}{2}t\right)$$

with the clock frequency $\geq f_s$; and converting two multilevel signals of the inphase channel and the quadrature channes having the clock frequency $f_s$ into a bit information sequence with clock frequency $f_t$, forming an output signal.

9. A system for transmission of QAM (quadrature amplitude modulation) signals for use in telecommunication networks for any data rates at a signal-to-noise ratio of below 0 dB, comprising:
 a device for forming a signal for transmission, comprising:
 converter of an information bit sequence with clock frequency $f_t$ into two multilevel sequences with clock frequency (symbol) frequency $f_s$ for forming an inphase channel and a quadrature channel;
 at least two multipliers for multiplying signals of the inphase and the quadrature channels with signal $$\mathrm{Cos}\left(2\pi\frac{f_s}{2}t\right)$$

having clock frequency $\geq 2f_s$;
 adders for summing up the signals of the inphase and the quadrature channels with signal $$A\cdot\mathrm{Sin}\left(2\pi\frac{f_s}{2}t\right)$$

having the clock frequency $\geq 2f_s$ wherein A is the level of additional components in the output spectrum of the signal for transmission;
 filters for filtering of the inphase and quadrature channels, extracting frequency components from 0 to $$\frac{f_s}{2};$$

and
 modulator for transferring the signals of the inphase and quadrature channels to the carrier frequency and forming an QAM signal for transmission.

10. A system for reception of QAM (quadrature amplitude modulation) signals for use in telecommunication networks for any data rates at a signal-to-noise ratio of below 0 dB, comprising:
 a device for processing a signal at reception, comprising:
 a device for extracting a clock frequency $f_s$ and a carrier frequency, the device for extracting comprising two PLLs, working together and implementing inphase processing of signal $$A\cdot\mathrm{Sin}\left(2\pi\frac{f_s}{2}t\right);$$

a demodulator of the received signal of carrier frequency for forming an inphase channel and a quadrature channels;
 one or more filters for extracting signal components at frequency $$\frac{f_s}{2}$$

from signals of the inphase and the quadrature channels;
 one or more multipliers for multiplying the signals of the inphase and quadrature channels by signal $$\mathrm{Cos}\left(2\pi\frac{f_s}{2}t\right)$$

having a clock frequency $\geq f_s$;
 converter of two multilevel signals of the inphase and the quadrature channels having the clock frequency $f_s$ into a bit information sequence with clock frequency $f_t$ for forming an output signal.

11. A system for transmission of QAM (quadrature amplitude modulation) signals for use in telecommunication networks for any data rates at a signal-to-noise ratio of below 0 dB, comprising:
 a device for forming a signal for transmission, comprising:
 a converter of an information bit sequence with clock frequency $f_t$ into a multilevel sequence with clock frequency (symbol) frequency $f_s$ for forming an inphase channel and a quadrature channel;
 an adder for summing up a signal of the inphase channel with a constant component A;
 one or more multipliers for multiplication of the signal of the inphase channel by signal $$\mathrm{Cos}\left(2\pi\frac{f_s}{2}t\right)$$

and a signal of the quadrature channel by signal $$\mathrm{Sin}\left(2\pi\frac{f_s}{2}t\right)$$

having clock frequency $\geq 2f_s$;
 filters for filtering the inphase and quadrature channels, extracting of frequency components from 0 to $$\frac{f_s}{2}$$

and forming of a spectrum for transmission; and
 a modulator for transferring the signals of the inphase and quadrature channels to the carrier frequency and forming a QAM signal for transmission.

12. A system for reception of QAM (quadrature amplitude modulation) signals for use in telecommunication networks for any data rates at a signal-to-noise ration of below 0 dB, comprising:

a device for processing a signal at reception, comprising:

a demodulator of a received signal of the carrier frequency for forming an inphase channel and a quadrature channel;

a device for extracting a clock frequency $f_s$ and a carrier frequency comprising two PLLs, working together and implementing inphase processing of signal $$A \cdot \operatorname{Sin}\left(2\pi \frac{f_s}{2} t\right);$$

one or more filters for extracting signal components at frequency $$\frac{f_s}{2}$$

from signals of the inphase and quadrature channels;

multipliers for multiplication of the signal of the inphase channel by signal $$\operatorname{Cos}\left(2\pi \frac{f_s}{2} t\right)$$

and the signal of the quadrature channel by signal $$\operatorname{Sin}\left(2\pi \frac{f_s}{2} t\right)$$

having clock frequency $\geq f_s$;

a converter of two multilevel signals of the inphase and the quadrature channels having the clock frequency $f_s$ into a bit information sequence with a clock frequency $f_t$ for forming an output signal.

* * * * *